United States Patent
Abiri et al.

(10) Patent No.: US 11,011,941 B2
(45) Date of Patent: May 18, 2021

(54) METHOD AND APPARATUS FOR WIRELESS POWER DELIVERY TRACKING

(71) Applicant: Auspion, Inc., Pasadena, CA (US)

(72) Inventors: Behrooz Abiri, Pasadena, CA (US); Seyed Ali Hajimiri, Pasadena, CA (US); Florian Bohn, Pasadena, CA (US)

(73) Assignee: GURU, INC., Pasadena, CA (US)

( * ) Notice: Subject to any disclaimer, the term of this patent is extended or adjusted under 35 U.S.C. 154(b) by 6 days.

(21) Appl. No.: 16/245,176

(22) Filed: Jan. 10, 2019

(65) Prior Publication Data

US 2019/0214855 A1    Jul. 11, 2019

Related U.S. Application Data

(60) Provisional application No. 62/615,710, filed on Jan. 10, 2018.

(51) Int. Cl.
| | |
|---|---|
| *H02J 50/23* | (2016.01) |
| *H02J 7/02* | (2016.01) |
| *H02J 50/40* | (2016.01) |
| *H02J 50/27* | (2016.01) |
| *H02J 50/80* | (2016.01) |
| *H01Q 21/22* | (2006.01) |

(52) U.S. Cl.
CPC ............ *H02J 50/23* (2016.02); *H02J 7/025* (2013.01); *H02J 50/27* (2016.02); *H02J 50/40* (2016.02); *H02J 50/80* (2016.02); *H01Q 21/225* (2013.01)

(58) Field of Classification Search
CPC .. H02J 50/23; H02J 50/80; H02J 50/27; H02J 50/40; H02J 7/025

USPC ......................................................... 307/104
See application file for complete search history.

(56) References Cited

U.S. PATENT DOCUMENTS

| | | | |
|---|---|---|---|
| 5,598,169 A | 1/1997 | Drabeck et al. | |
| 6,621,467 B1* | 9/2003 | Marsh ............... | G06K 19/0726 340/572.7 |
| 2004/0155754 A1* | 8/2004 | Fischer ............... | H04B 5/0075 340/10.34 |
| 2012/0217818 A1* | 8/2012 | Yerazunis .............. | H02J 50/40 307/104 |

(Continued)

OTHER PUBLICATIONS

PCT/US2019/013076 International Search Report and Written Opinion dated Apr. 14, 2019.

*Primary Examiner* — Michael R. Fin
(74) *Attorney, Agent, or Firm* — Alston & Bird LLP

(57) ABSTRACT

A wireless power generating unit, includes, in part, a multitude of transmitting elements transmitting a multitude of RF signals to a wireless device, a backscatter RF receiver configured to receive the backscattered RF signal from the wireless device in response to the transmission of the RF signals, and a processor adapted to change the phases of the multitude of RF signals values in accordance with the strength of the received backscattered signal. The phases are changed to maximize the strength of the backscattered signal which may be modulated by varying a resistive load at the wireless device. The modulated backscattered signal may be encoded to carry information. The modulation frequency may be representative of the identity of the wireless device. The information may define the amount of RF power received by the wireless device.

18 Claims, 4 Drawing Sheets

(56) References Cited

U.S. PATENT DOCUMENTS

| | | | |
|---|---|---|---|
| 2015/0091706 A1* | 4/2015 | Chemishkian | H02J 50/20 |
| | | | 340/10.34 |
| 2015/0229133 A1* | 8/2015 | Reynolds | H02J 50/80 |
| | | | 307/24 |
| 2016/0043572 A1 | 2/2016 | Cooper et al. | |
| 2017/0149294 A1 | 5/2017 | Wight et al. | |
| 2017/0317529 A1 | 11/2017 | Smith et al. | |

* cited by examiner

METHOD AND APPARATUS FOR WIRELESS POWER DELIVERY TRACKING

CROSS REFERENCE TO RELATED APPLICATIONS

The present application claims benefit under 35 USC 119(e) of U.S. Application Ser. No. 62/615,710, filed Jan. 10, 2018, the content of which is incorporated herein by reference in its entirety.

FIELD OF THE INVENTION

The present invention relates to wireless power delivery and tracking.

BACKGROUND OF THE INVENTION

Wireless power delivery enables powering up or charging electronic devices remotely. United States Patent Publication No. 20140175893 discloses an array of frequency synchronous RF sources with programmable phase settings to radiate and deliver energy to a target location where a device with an energy recovery unit receives the RF power and converts it to DC power.

To deliver power to the desired location and track the recovery unit as it moves and changes its location, the phase setting of the RF sources need to change dynamically to keep the energy focused on the recovery unit continuously.

One known method, as disclosed in United States Patent Publication No. 20120326660, is phase conjugation in which the recovery unit transmits a pilot signal. The power generating unit records the phase of the pilot signal received at each of its antennas and applies the conjugated phase to that RF source. To achieve this, the recovery unit includes a signal generation circuit to generate an RF pilot whose frequency must match the frequency of the generating unit. The generating unit is similarly required to include at least one coherent receiver per antenna of its antenna array. Therefore, generating a conjugated phase using a pilot signal requires a relatively high level of complexity in the power generating unit as well as the recovery unit. In addition, tracking the frequency of the RF pilot signal consumes considerable amount of power. Furthermore, since during transmission of the pilot signal, the generating unit is not transmitting power and is in the listening mode, local energy storage (such as batteries) are required during the tracking. A need continues to exist for an improved method of wireless power delivery and tracking.

BRIEF SUMMARY OF THE INVENTION

A method of delivering power wirelessly, in accordance with one embodiment of the present invention, includes, in part, delivering a multitude of RF signals to a wireless device from a multitude of transmitting elements of a generating unit, receiving at the generating unit a backscattered RF signal from the wireless device, and changing the phases of the RF signals in accordance with a strength of the received backscatter signal.

In one embodiment, the changed phases maximize the strength of the backscattered signal. In one embodiment, the method further includes, in part, modulating the backscattered RF signal at the wireless. In one embodiment, the method further includes, in part, varying an impedance of a load at the wireless device to modulate the backscattered RF signal. In one embodiment, the method further includes, in part, causing the load to be shorted to a ground terminal. In one embodiment, the method further includes, in part, causing the load to be in an open-circuit state. The load may be resistive, capacitive or inductive.

In one embodiment, the method further includes, in part, encoding the modulated backscattered RF signal to carry information. In one embodiment, the method further includes, in part, modulating the backscattered RF signal at a first frequency representative of the identity of the wireless device. In one embodiment, the information defines the amount of RF power received by the wireless device. In one embodiment, the modulation is one of phase or amplitude modulation.

A wireless power generating unit, in accordance with one embodiment of the present invention, includes, in part, a multitude of transmitting elements transmitting a multitude of RF signals to a wireless device, a backscatter RF receiver configured to receive the backscattered RF signal from the wireless device in response to the transmission of the RF signals, and a processor adapted to change the phases of the multitude of RF signals values in accordance with a strength of the received backscattered signal.

In one embodiment, the changed phases maximize the strength of the backscattered signal. In one embodiment, the backscattered signal is modulated. In one embodiment, the backscattered signal is modulated by varying a load at the wireless device. In one embodiment, the load is varied by shorting the load to a ground terminal. In one embodiment, the load is varied by causing the load to be in an open-circuit state. The load may be resistive, capacitive or inductive.

In one embodiment, the modulated backscattered signal is encoded to carry information. In one embodiment, the backscattered signal is modulated at a first frequency representative of the identity of the wireless device. In one embodiment, the information defines an amount of RF power received by the wireless device. In one embodiment, the modulation is one of phase or amplitude modulation.

DETAILED DESCRIPTION OF THE INVENTION

In accordance with one embodiment of the present invention, dynamic adjustment of the phases of RF sources in a generating unit delivering RF power is achieved using a low-power low-overhead circuit disposed in the mobile device being charged with the RF power. Such a circuit transmits information representative of the amount of power being recovered by the mobile device back to the power generating unit, thereby allowing battery-free operation of tracking.

Embodiments of the present invention thus dispense the need for an analog-to-digital converter (ADC)—to sense the received power—and a wireless transceiver, both of which would otherwise be required to transmit information about the recovered power from the mobile device back to the generating unit to enable dynamic phase adjustment. As is known, an ADC, a transceiver and their associated circuitry consume additional power thus necessitating the inclusion of an energy storage device, such as a battery, in the mobile device leading to degradation of the overall performance of the RF power recovery unit disposed in the mobile device.

If an antenna connected to a matched load is radiated with an RF wave, the captured RF energy is absorbed by the antenna resulting in an unappreciable amount of backscattered signal from the antenna. However, if the antenna load is not matched to the impedance of the antenna, then some of the incident RF wave will backscatter. The strength of backscattered signal is proportional to the amount of mismatch between the load and the antenna impedance as well as on the power of the incident RF signal. The phase of the backscatter signal is dependent on the type of mismatch (for example short or open have 180 degrees opposite backscattering phases), as well as on the location of the mismatch with respect to the antenna.

In accordance with one embodiment of the present invention, the signal backscattered by the mobile device is used to vary the phases of the individual transmitting elements of an RF transmitter array so as to maximize the RF signal delivered to charge the mobile device. In one embodiment, to distinguish the RF signal backscattered by a target mobile device from the RF signals backscattered by all other potential objects, the target mobile device modulates the RF signal it backscatters. In one embodiment, such modulation is achieved by modulating the load seen by the antenna disposed in the target mobile device.

Figure 1:
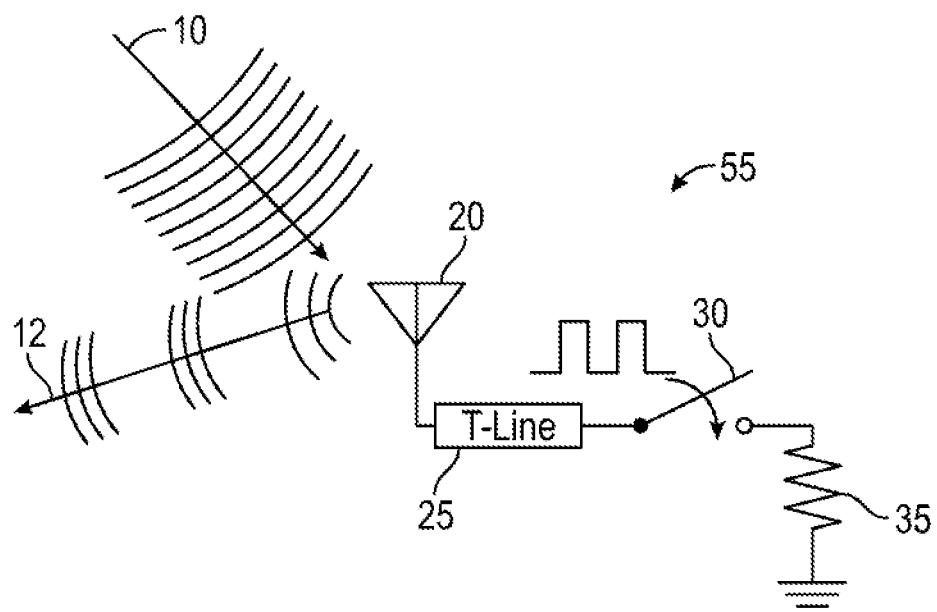
FIG. 1 shows a number of components of a wireless device receiving RF power, in accordance with one embodiment of the present invention.

Modulating the load of an antenna results in the modulation of the amplitude and phase of the RF signal backscattered by the antenna. FIG. 1 shows a number of components of a wireless device 55 being charged by RF power, in accordance with one embodiment of the present invention. It is understood that wireless device 55 which may be a cellular phone or otherwise, includes many other components not shown in FIG. 1 for simplicity. Wireless device 55 is shown as including, in part, an antenna 20, transmission line 25, a switch 30 and matched resistive load 35. Antenna 20 is shown as receiving the RF signal incident along direction 10. Switch 30 is configured to close and open in a periodic manner. When switch 30 is closed, antenna 30 receives the resistance of load 35. When switch 30 is open, antenna 30 receives a relatively large resistive load of the open circuit formed by opening the switch. By closing an opening switch 30 in response to a periodic signal, the amplitude and phase of the RF signal backscattered by the antenna—shown as radiating along direction 12—is thus modulated.

Figure 2:
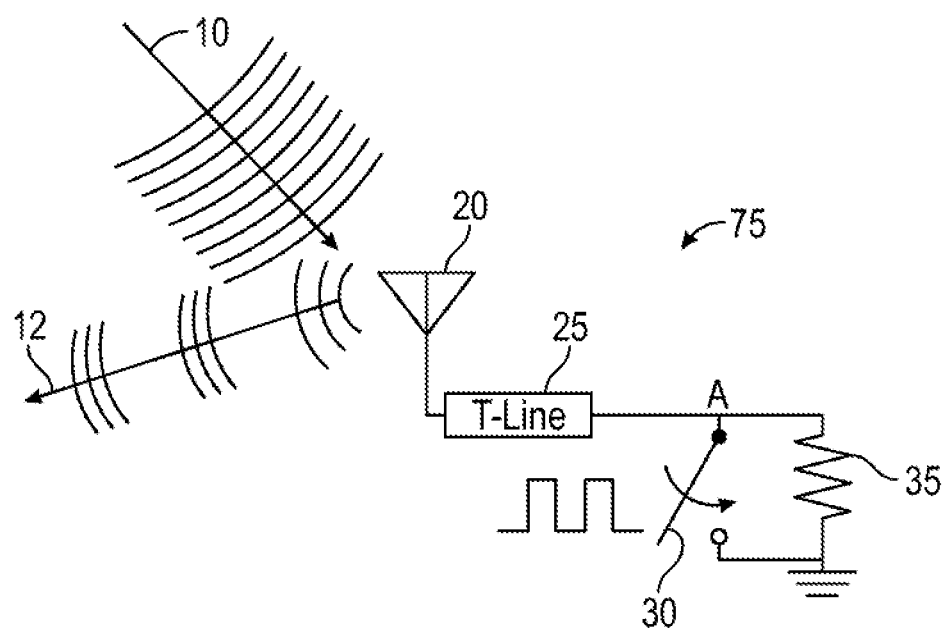
FIG. 2 shows a number of components of a wireless device receiving RF power, in accordance with one embodiment of the present invention.

FIG. 2 shows a number of components of a wireless device 75 being charged by RF power, in accordance with another embodiment of the present invention. Antenna 20 is shown as receiving the RF signal incident along direction 10. Switch 30 is caused to close and open in a periodic manner. When switch 30 is open, antenna 20 receives the resistance of resistive load 35. When switch 30 is closed, node A is shorted to ground. By closing an opening switch 30 in response to a periodic signal, the amplitude and phase of the RF signal backscattered by the antenna—shown as radiating along direction 12—is thus modulated.

It is understood that any other circuitry that can vary the resistive load seen by the antenna may be used to modulate the backscattered signal. In some embodiments, an encoder disposed in the target mobile device may be used to encode the signal modulated by load 35 with a message, such as device identification number. The power required to modulate the load is relatively small.

The amount of backscattered power depends on the amount of load mismatch as well as on the power of the incident RF signal. The stronger the RF signal received by the antenna, the stronger is the backscatter signal. In accordance with one embodiment of the present invention, the phases of the transmitting elements of a generating unit delivering RF power to a target mobile device are adjusted so as to cause the RF signal backscattered by the target mobile device and received by the generating unit to be maximized. Therefore, in accordance with one aspect of the present invention, by measuring the intensity of the backscattered RF signal at the generating unit and varying the phases of its transmitting elements in response, the intensity of the backscattered signal, and consequently the RF power delivered to the target mobile device is maximized.

Figure 3:
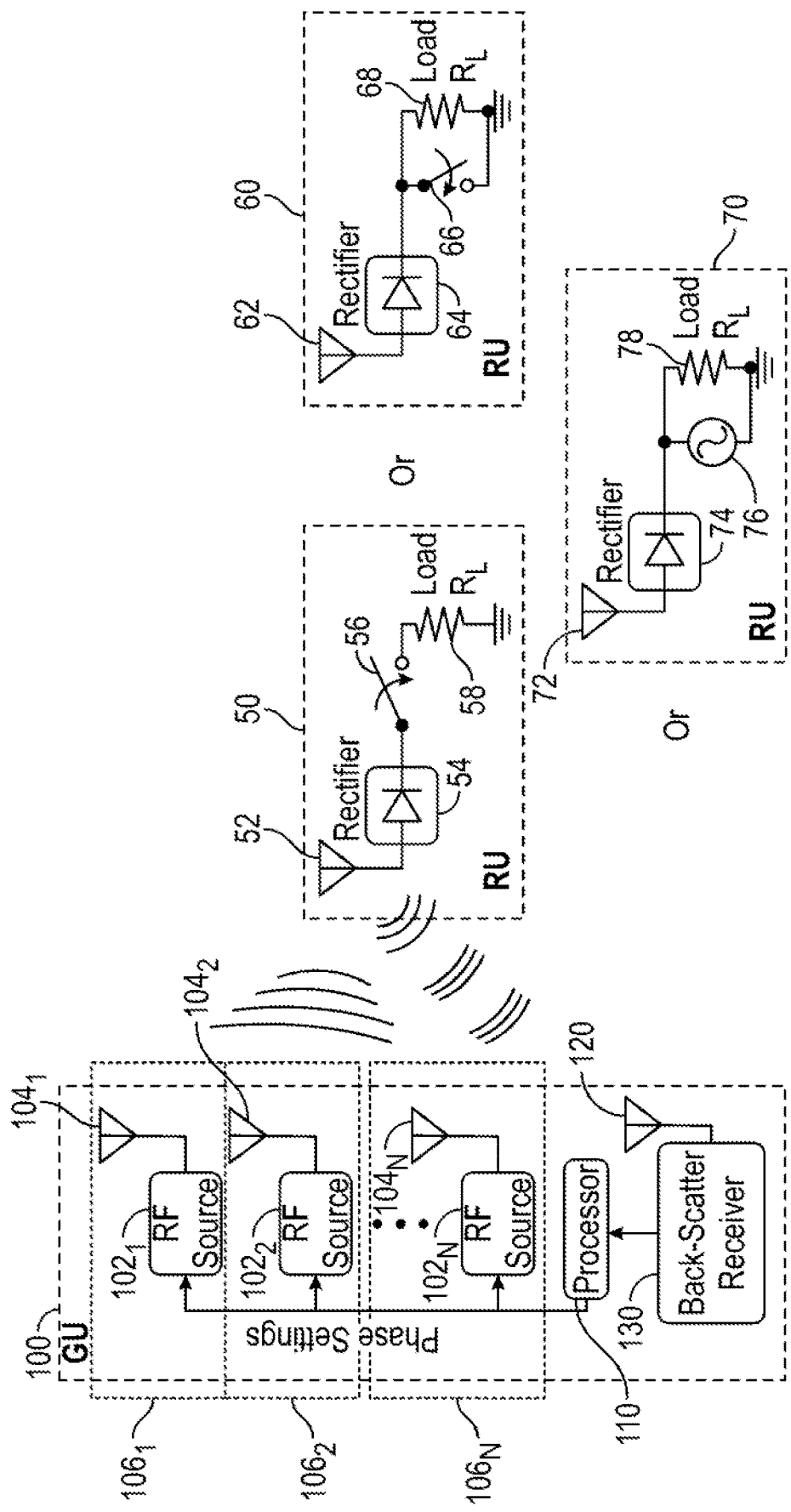
FIG. 3 shows an RF signal generating unit wirelessly powering a multitude of mobile devices, in accordance with one embodiment of the present invention.

FIG. 3 shows an RF signal generating unit 100 wirelessly powering a multitude of mobile devices 50, 60 and 70, in accordance with one embodiment of the present invention. RF signal generating unit 100 is shown as including an array N of RF signal transmitting elements $106_1$, $106_2$ ... $106_N$, wherein N is an integer greater than one. Each transmitting element is shown as including, in part, an RF signal source $102_i$ whose phase may be varied by processor/controller 110, and an antenna $104_i$. For example, transmitting element $106_1$ is shown as including, in part, an RF source $102_1$ and an antenna $104_1$. Similarly, transmitting element $106_N$ is shown as including, in part, an RF source $102_N$ and an antenna $104_N$. The phase of the RF signal generated by each RF source $102_i$, where i is an integer varying from 1 to N, may be varied by processor/controller 110 before the RF signal is transmitted by the RF source's associated antenna $104_i$.

Generating unit 100 is also shown as including a receive antenna 120 that receives the RF signal backscattered by the mobile devices, and a backscatter receiver 130 that determines, among other things, the intensity or strength of the backscattered RF signal received by antenna 120.

Each mobile device, such as a smart phone, and the like (referred to herein alternatively as recovery unit) is shown as including, in part, an antenna, a rectifier, a load modulating circuit. For example, mobile device 50 is shown as including, in part, an antenna 52, a rectifier 54 adapted to convert the RF signal to a substantially DC signal, and a load modulating circuit that includes resistive load 58 and switch 56 which operate as described above with reference to FIG. 1. Similarly, mobile device 60 is shown as including, in part, an antenna 62, a rectifier 64 adapted to convert the RF signal to a substantially DC signal, and a load modulating circuit that includes resistive load 68 and switch 66 which operate as described above with reference to FIG. 2. It is understood that each mobile device includes many other components not shown in FIG. 3 for simplicity.

As described above, part of the RF signal received by a mobile device from generating unit 100 is backscattered by the mobile device. As is also described above, each mobile device is configured to modulate the output load of its rectifier (or antenna) to modulate the resistance (impedance) connected to its associated antenna, thereby to modulate the RF signal backscattered by that mobile device. For example, mobile devices 50 or 60 modulate the RF signal they backscatter by opening and closing their respective switches 56, 66 which respectively vary the impedance seen by their respective rectifiers 54, 64. Modulating the load impedance will change the voltage and current on the output of the rectifier (for example open load will result in zero current and maximum voltage or short load results in zero voltage and maximum current). An AC source, such as ac source 76 shown in mobile device 70 also modulates the voltage (and current) of the rectifier output, thereby, in effect, changing the load impedance. Because the modulation scheme used by mobile devices 50, 60 and 70 are different, as shown, the signal backscattered by each of mobile device has a unique signature that is used by generating unit 100 to identify that mobile device from among the other mobile devices.

The signal backscattered by a mobile device is received by antenna 120 of generating unit 100. Backscatter receiver 130 and/or processor 110 of generating unit 100 determine the strength and the signature of the received backscatter signal to uniquely identify the mobile device from which the backscattered signal is received. Thereafter, in one embodiment, processor 110 varies the phases of the RF signals transmitted by antennas $104_1$-$104_N$ until the strength of the backscatter signal received from the targeted mobile device so identified reaches a near maximum value. When such as maximum value is reached, the phases of the RF sources $106_1$-$106_N$ are considered to have been set to optimum values.

It is understood that the modulation of the rectifier/antenna load is not limited to connecting or disconnecting the load, and that load modulation may be achieved through any other currently known or future techniques.

The modulation signature or scheme used by a mobile device may be identified by the generating unit by the frequency of the modulation when a single frequency on-off modulation is used. Alternatively the mobile device may send a unique key via the modulated backscattered RF signal that is subsequently decoded by the backscatter receiver 130 of generating unit 100 to uniquely identify that mobile device. It is understood that various switching and demodulation schemes may be used as a way of identifying, among other things, (i) various devices; and/or (ii) various antennas disposed within a given device, particularly, for example, when time multiplexing is used to power multiple mobile devices.

Figure 4:
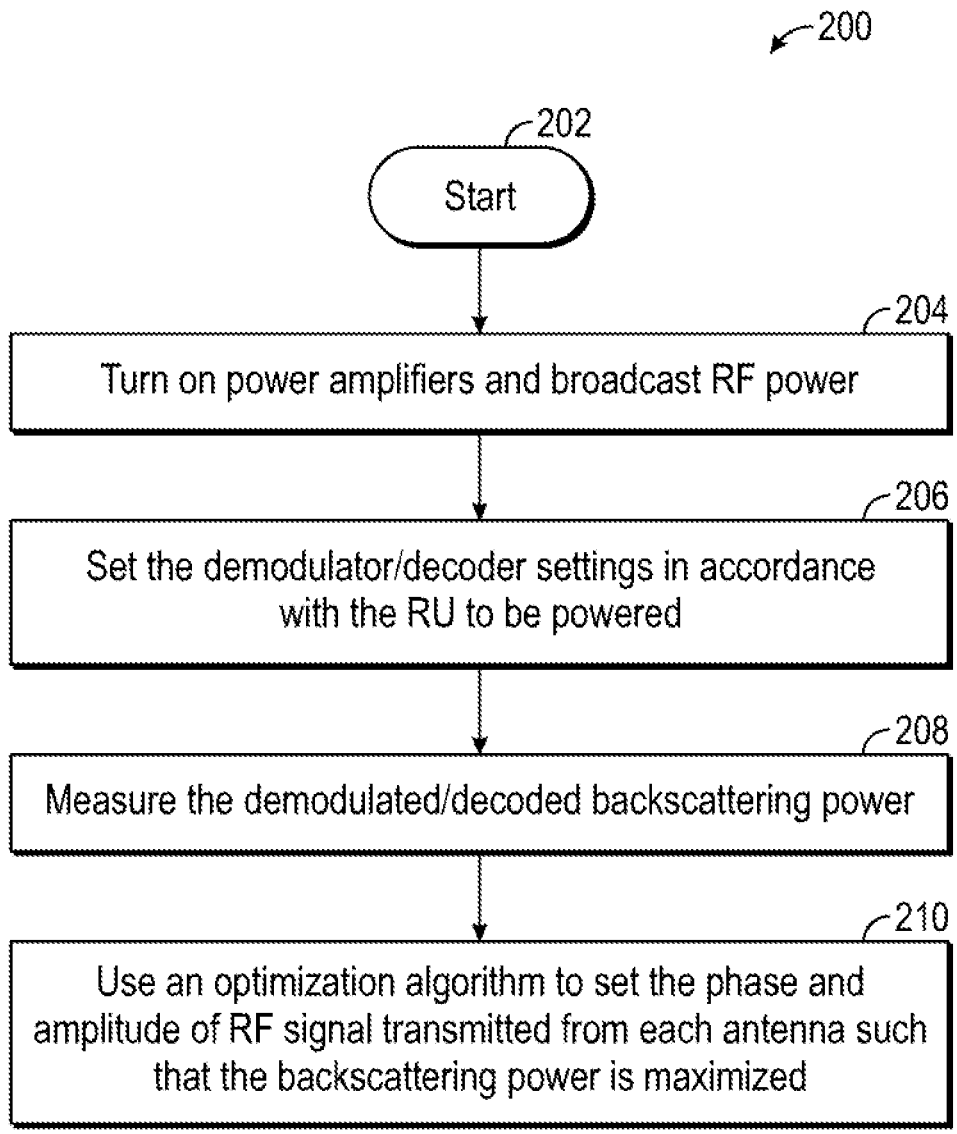
FIG. 4 is a flowchart for maximizing the RF power delivered to a mobile device using a backscattered signal, in accordance with one embodiments of the present invention.

FIG. 4 is a flowchart for tracking the location of a mobile device and maximizing the RF power delivered to the mobile device using a backscattered signal, in accordance with embodiments of the present invention. After start at 202, the amplifiers disposed in the transmitting elements, such as RF sources $102_i$ shown in FIG. 3, are turned at 204 on so as to cause a multitude of RF signals to be transmitted from the multitude of antennas of the generating unit. Next, the demodulator (and/or any decoder) disposed in the generating unit is activated so as to demodulate (and/or decode) the signal backscattered by the target mobile devices. Next, at 208, the backscattered signal received by the generating unit is demodulated (and/or decoded) and subsequently measured to determine its strength. Thereafter at 210, using an optimization algorithm, the phases and/or amplitudes of the RF signal transmitted by each transmitting element and its associated antenna is varied so as to cause the backscatter signal received by the generating unit reach a maximum value.

Figure 5:
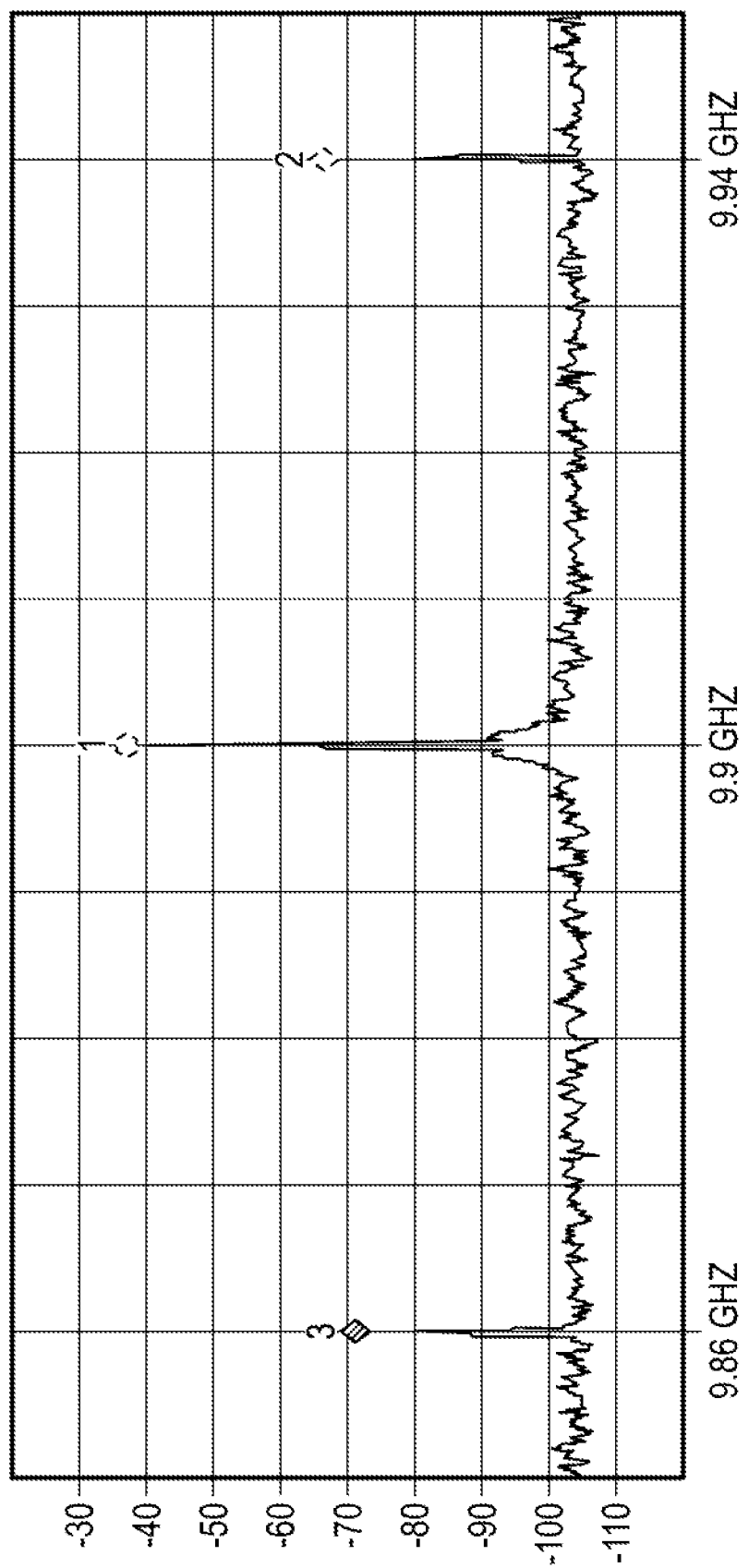
FIG. 5 shows the frequency spectrum of a measured backscattered signal, in accordance with one exemplary embodiment of the present invention.

To demonstrate that modulating the load of a rectifier/antenna in the mobile device causes modulation in the signal backscattered by the mobile device, in one experiment, the DC output of a rectifier was connected to and disconnected from ground at a rate of 40 MHz. The mobile device was radiated with a single frequency tone by a transmitter mimicking a generating unit (such as generating unit 100 shown in FIG. 3) operating at 9.9 GHz. FIG. 5 shows the frequency spectrum of the measured backscattered (reflected) signal. As is seen from FIG. 5, the backscattered signal contains clearly identifiable tones at ±40 MHz offset from the radiated tone of 9.9 GHz, i.e. at 9.86 GHz and 9.94 GHz. The two tones only appear if the load of rectifier is modulated. The two tones are also representative of the amount of power that is backscattered by the mobile device and subsequently received at the generating unit. Hence, embodiments of the present invention, by using the backscattered signal (i) obviate the need for a separate communication channel from the mobile device to the generating unit that would be otherwise required to establish a feedback link for optimization and tracking, and (ii) further reduce the need for relatively complex and power-hungry circuitry that would also be otherwise required by the mobile device where energy is at a higher premium.

In one embodiment, the phases/amplitudes of the individual transmitting elements of the generating unit may be initially set using a lookup table. There are a number of ways to get an accurate read of the power received by the mobile device under different phase/amplitude settings for the generating unit. In one exemplary embodiment, such information can be obtained by starting from a known phase settings for the transmitting elements (e.g., a random phase setting for the transmitting) to generate a well-defined energy pattern to evaluate the power level received by the mobile device more accurately. Using random phase combinations results in a relatively broad radiation pattern but since the power is spread and not focused, the mobile device receives a relatively small amount of power. This technique desensitizes the overall RF transmit/receive system to orientation changes and other environmental variations thus making it more robust.

In another embodiment, a set of preprogrammed (partially) focused beams are used to send power to the mobile device initially which may be used to power up, for example, the modulating circuitry of the mobile device. Transmitting a relatively larger power initially to the mobile device may be advantageous as it results in a larger backscatter power thus rendering it easier to detect. Also, larger power enables the mobile device to recover some of the radiated signal to power up the load modulation circuitry thus dispensing the need for the device to carry its own energy storage. To send more power initially, the energy beam needs to be partially focused on the device. Since the location of the device is not known initially, a set of focal points may be tested initially to detect the device. As soon as the mobile device starts to receive power, the mobile device starts the backscattering circuitry to transmit backscatter signal.

As described above, the information about the power received by the mobile device is implicitly present in the amplitude of the signal backscattered by the mobile device and received by the generating unit. In one embodiment, the modulated backscattered signal is caused to contain information about the power received by the mobile device explicitly. Such information may be included in any modulation scheme applied to the backscattered signal such as frequency modulation, phase modulation and ASK, PSK, and the like. In such embodiments, the identity of the mobile device and any other information that the mobile device seeks to transmit to the generating unit may piggyback on the data representative of the amount of power that the mobile device receives from and reports back to the generating unit using either the same modulation scheme or a different modulation scheme that does not interfere with the reported data.

The above embodiments of the present invention are illustrative and not limitative. Embodiments of the present invention are not limited by the type of device that may be wirelessly charged. Embodiments of the present invention are not limited by the type of modulation, encoding and the like. Other additions, subtractions or modifications are obvious in view of the present disclosure and are intended to fall within the scope of the appended claims.

What is claimed is:

1. A method of delivering power wirelessly, the method comprising:
    delivering a plurality of RF signals to a wireless device from a plurality of transmitting elements of a generating unit, said plurality of RF signals having a first plurality of phase values;
    receiving at the generating unit a backscattered RF signal from the wireless device:
    changing the phases of the plurality of RF signals to a second plurality of values different from the first plurality of values in accordance with a strength of the received backscatter signal;
    modulating the backscattered RF signal at the wireless device; and
    encoding the modulated backscattered RF signal to carry information representative of an amount of RF power received by the wireless device.

2. The method of claim 1 wherein said second plurality of phase values maximizes the strength of the backscattered signal.

3. The method of claim 1 further comprising:
    varying an impedance of a load at the wireless device to modulate the backscattered RF signal.

4. The method of claim 3 further comprising:
    causing the load to be shorted to a ground terminal.

5. The method of claim 3 further comprising:
    causing the load to be in an open-circuit state.

6. The method 3 further comprising:
    modulating the backscattered RF signal at a first frequency representative of an identity of the wireless device.

7. The method of claim 1 wherein said modulation is one of phase or amplitude modulation.

8. A wireless power generating unit comprising:
    a plurality of transmitting elements transmitting a plurality of RF signals having a first plurality of phase values to a wireless device;
    a backscatter RF receiver configured to receive a backscattered RF signal from the wireless device in response to the transmission of the plurality of RF signals;
    a processor adapted to change the phases of the plurality of RF signals to a second plurality of values different from the first plurality of values in accordance with a strength of the received backscattered signal, wherein said backscattered signal is modulated and encoded to carry information representative of an amount of RF power received by the wireless device.

9. The wireless power generating unit of claim 8 wherein said second plurality of phase values maximizes the strength of the backscattered signal.

10. The wireless power generating unit of claim 8 wherein said backscattered signal is modulated by varying an impedance of a load at the wireless device.

11. The wireless power generating unit of claim 10 wherein varying the load comprises shorting the load to a ground terminal.

12. The wireless power generating unit of claim 10 wherein varying the load comprises causing the load to be in an open-circuit state.

13. The wireless power generating unit of claim 10 wherein said backscattered signal is modulated at a first frequency representative of an identity of the wireless device.

14. The wireless power generating unit of claim 10 wherein said modulation is one of phase or amplitude modulation.

15. The method of claim 3 wherein said load is a resistive load.

16. The method of claim 3 wherein said load is one of capacitive or inductive load.

17. The wireless power generating unit of claim 10 wherein said load is a resistive load.

18. The wireless power generating unit of claim 10 wherein said load is one of capacitive or inductive load.

* * * * *